United States Patent
Ichihara et al.

(10) Patent No.: US 10,411,273 B2
(45) Date of Patent: Sep. 10, 2019

(54) SINGLE CELL STRUCTURE FOR FUEL CELLS, AND FUEL CELL STACK STRUCTURE WHEREIN SAID FUEL CELL SINGLE CELLS ARE STACKED

(71) Applicant: NISSAN MOTOR CO., LTD., Yokohama-shi, Kanagawa (JP)

(72) Inventors: Keiji Ichihara, Kanagawa (JP); Motoki Yaginuma, Kanagawa (JP); Akira Yasutake, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 15/772,707

(22) PCT Filed: Nov. 6, 2015

(86) PCT No.: PCT/JP2015/081286
§ 371 (c)(1),
(2) Date: May 1, 2018

(87) PCT Pub. No.: WO2017/077634
PCT Pub. Date: May 11, 2017

(65) Prior Publication Data
US 2019/0173102 A1 Jun. 6, 2019

(51) Int. Cl.
*H01M 8/0273* (2016.01)
*H01M 8/0258* (2016.01)
(Continued)

(52) U.S. Cl.
CPC ....... *H01M 8/0273* (2013.01); *H01M 8/0254* (2013.01); *H01M 8/0258* (2013.01);
(Continued)

(58) Field of Classification Search
CPC ............ H01M 8/0258; H01M 8/2483; H01M 8/0254; H01M 8/0273; H01M 8/1006;
(Continued)

(56) References Cited

U.S. PATENT DOCUMENTS 8,999,597 B2  4/2015  Ikezoe et al.
9,450,252 B2  9/2016  Oku et al.
(Continued)

FOREIGN PATENT DOCUMENTS

JP      2005-108506 A    4/2005
WO   WO-2011/158551 A1  12/2011
(Continued)

*Primary Examiner* — Amanda C. Walke
(74) *Attorney, Agent, or Firm* — Foley & Lardner LLP

(57) ABSTRACT

The fuel cell single cell of the present invention includes: a membrane electrode assembly; a low-rigidity frame that supports the membrane electrode assembly; a pair of separators that holds the low-rigidity frame and the membrane electrode assembly therebetween; a gas channel for supplying gas to the membrane electrode assembly between the pair of separators; manifold parts that are formed in the low-rigidity frame and the pair of separators to supply the gas to the gas channel; restraining ribs that restrain the low-rigidity frame near the manifold parts; a projected part of the low-rigidity frame that projects toward the manifold parts beyond the restraining ribs; and a gas flow part that is formed in the projected part to supply the gas from the manifold part to the gas channel.

10 Claims, 14 Drawing Sheets

(51) Int. Cl.
  *H01M 8/1006* (2016.01)
  *H01M 8/0254* (2016.01)
  *H01M 8/2483* (2016.01)
  *H01M 8/242* (2016.01)
  *H01M 8/0267* (2016.01)
  *H01M 8/1018* (2016.01)

(52) U.S. Cl.
  CPC ......... *H01M 8/1006* (2013.01); *H01M 8/242* (2013.01); *H01M 8/2483* (2016.02); *H01M 8/0267* (2013.01); *H01M 2008/1095* (2013.01)

(58) Field of Classification Search
  CPC ............... H01M 8/242; H01M 8/0267; H01M 2008/1095
  USPC ........................................................ 429/463
  See application file for complete search history.

(56) References Cited

U.S. PATENT DOCUMENTS

| | | | |
|---|---|---|---|
| 10,199,663 B2* | 2/2019 | Kageyama | H01M 8/0273 |
| 2009/0291350 A1 | 11/2009 | Ishida et al. | |
| 2011/0207018 A1* | 8/2011 | Nakagawa | H01M 8/0258 429/483 |
| 2012/0156584 A1 | 6/2012 | Uehara | |
| 2012/0178011 A1 | 7/2012 | Sugiura et al. | |
| 2012/0321987 A1 | 12/2012 | Goto et al. | |
| 2013/0014377 A1* | 1/2013 | Watanabe | H01M 8/0247 29/527.1 |
| 2013/0071769 A1 | 3/2013 | Ikezoe et al. | |
| 2015/0188152 A1* | 7/2015 | Mitsuta | H01M 8/0273 429/481 |
| 2015/0357656 A1* | 12/2015 | Farrington | H01M 8/242 429/457 |
| 2016/0072136 A1 | 3/2016 | Kageyama | |
| 2016/0079610 A1 | 3/2016 | Oku et al. | |
| 2018/0138524 A1* | 5/2018 | Yaginuma | H01M 8/24 |
| 2018/0358634 A1* | 12/2018 | Sekine | H01M 8/0271 |

FOREIGN PATENT DOCUMENTS

| | | |
|---|---|---|
| WO | WO-2014/174944 A1 | 10/2014 |
| WO | WO-2014/174959 A1 | 10/2014 |

* cited by examiner

SINGLE CELL STRUCTURE FOR FUEL CELLS, AND FUEL CELL STACK STRUCTURE WHEREIN SAID FUEL CELL SINGLE CELLS ARE STACKED

TECHNICAL FIELD

The present invention relates to a single cell structure for fuel cells, in more detail to a fuel cell single cell with improved robustness, and a fuel cell stack structure wherein said fuel cell single cells are stacked.

BACKGROUND ART

For example, a fuel cell single cell is formed by supporting a membrane electrode assembly (MEA) including an anode electrode and a cathode electrode oppositely disposed respectively on one and the other sides of an electrolyte membrane with a frame and holding the membrane electrode assembly and the frame between a pair of separators. Such fuel cell single cells are used as a fuel cell stack in which a predetermined number of fuel cell single cells are stacked.

Fuel gas, e.g. hydrogen-based gas, is supplied to the anode electrode of the fuel cell single cell, where the hydrogen is ionized on an electrode catalyst and moved to the cathode electrode through the electrolyte membrane.

Oxidant gas, e.g. oxygen-based gas or air, is supplied to the cathode electrode, where the above-described hydrogen ion, electron and oxygen cause a reaction to generate water while the produced electron is collected to an external circuit and used as direct-current electric energy.

In the outer periphery of the fuel cell single cell, manifold parts are typically formed to penetrate the frame and the separators in the stacking direction. The reaction gases are supplied from manifold parts to the anode and cathode electrodes through the pair of separators.

JP 2005-108506A (Patent Document 1) discloses covering opening ends correspond to such a manifold parts of separators by sealing members so as to form reaction gas coupling channels in the sealing members for distributing reaction gases. It is described that the sealing members having the reaction gas coupling channels enable to form a fuel cell that does not cause a gas leakage and has high air-tightness in which flow of the reaction gases are not blocked.

CITATION LIST

Patent Literature

Patent Document 1: JP 2005-108506A

SUMMARY OF INVENTION

Technical Problem

In recent years, attempts have been made to improve the performance of a fuel cell single cell by thinning the membrane electrode assembly or the like. However, it is difficult to secure sufficient rigidity while thinning a frame that supports the membrane electrode assembly, and the frame may sometimes be deformed to block flow of the reaction gas supplied from a manifold part.

The present invention has been made in view of the above-described problem with the prior art, and an object thereof is to provide a fuel cell single cell with improved robustness that can distribute reaction gas to a membrane electrode assembly with such simple structure, and a fuel cell stack using the fuel cell single cells.

Solution to Problem

As a result of a keen study for achieving the above-described object, the present inventors have found that the above-described object can be achieved by providing a gas flow part for supplying reaction gas in the frame, which prevents flow of reaction gases from being blocked even when the frame is deformed.

That is, the single cell structure for fuel cells of the present invention includes a membrane electrode assembly, a low-rigidity frame that supports the membrane electrode assembly and a pair of separator that holds the low-rigidity frame and the membrane electrode assembly therebetween.

The single cell structure further includes a gas channel for supplying gas to the membrane electrode assembly between the pair of separators, and manifold parts for supplying the gas to the gas channel are formed in the low-rigidity frame and the pair of separators.

The single cell structure further includes a restraining rib that is disposed in the gas channel near the manifold parts to restrain the low-rigidity frame. The low-rigidity frame includes a projected part that projects toward the manifold parts beyond the restraining rib, and the projected part includes a gas flow part for supplying the gas from the manifold parts to the gas channel.

The fuel cell stack structure of the present invention includes a stacked plurality of fuel cells each including the above-described single cell structure.

Advantageous Effects of Invention

In the present invention, the projected part of the low-rigidity frame includes the gas flow part. This can prevent the gas channel between the pair of separators from being closed even when the low-rigidity frame is deformed, and the reaction gas flows well with such simple configuration.

DESCRIPTION OF EMBODIMENTS

Fuel Cell Stack

The fuel cell stack FS of the present invention includes a stacked plurality of fuel cell single cells C, which are described later.

Figure 1A:
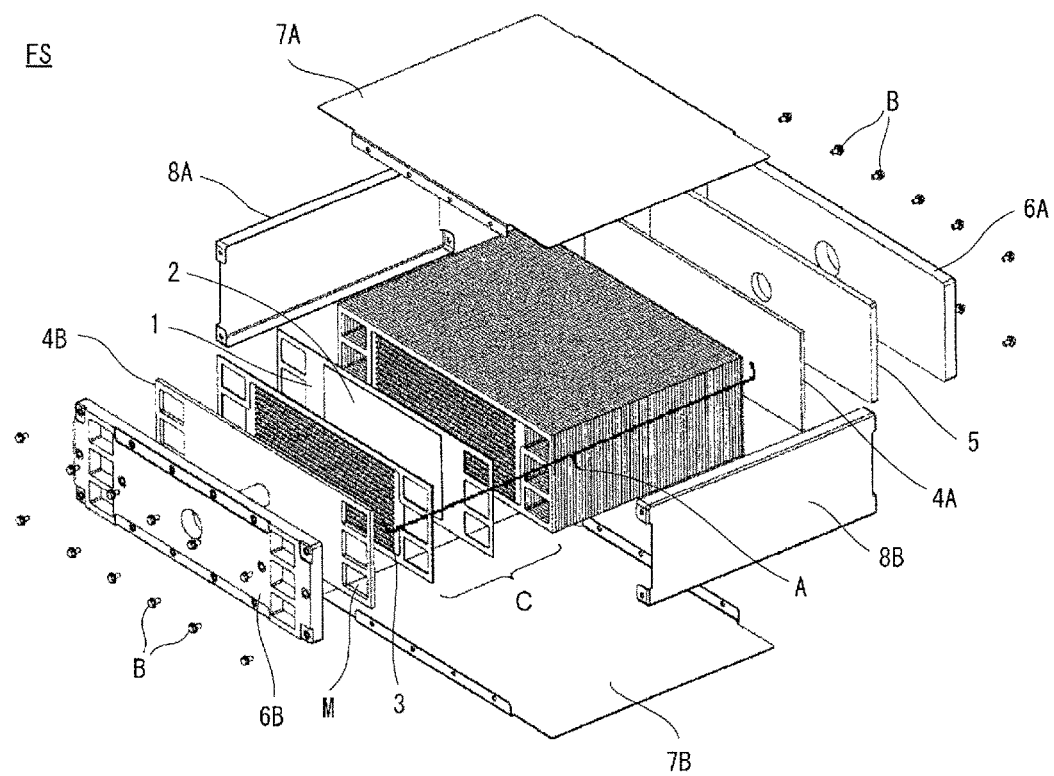
FIG. 1A is an exploded perspective view of a fuel cell stack composed of stacked fuel cell single cells as illustrated in FIG. 2
Figure 1B:
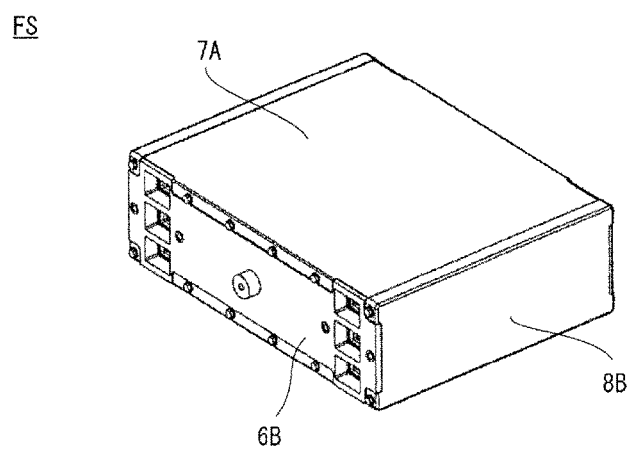
FIG. 1B is a perspective view of the assembled fuel cell stack.

As illustrated in FIG. 1A and FIG. 1B, the fuel cell stack FS is constituted by the stacked plurality of fuel cell single cells C. As illustrated in FIG. 1A, the fuel cell stack FS includes an end plate 6A disposed to a stack A of the fuel cell single cells C on one end (right end in FIG. 1A and FIG. 1B) in the stacking direction of the single cells via a current collector plate 4A and a spacer 5, and an end plate 6B on the other end via a current collector plate 4B.

The fuel cell stack FS further includes fastening plates 7A, 7B on both ends corresponding to the long sides of the fuel cell single cells C of the stack A (upper and bottom faces in FIG. 1A and FIG. 1B) and reinforcing plates 8A, 8B on both sides corresponding to the short sides.

In the fuel cell stack FS, the fastening plates 7A, 7B and the reinforcing plates 8A, 8B are each coupled to both of end plates 6B, 6B by bolts B. The fuel cell stack FS has such a case-integrated structure as illustrated in FIG. 1B, which restrains and presses the stack A in the stacking direction of the single cells to apply a predetermined contact surface pressure to each of the fuel cells C, so that the gas sealing property, the electrical conductivity and the like are maintained at high level.

Fuel Cell Single Cell

The fuel cell single cell of the present invention will be described in detail.

The fuel cell single cell includes a membrane electrode assembly supported by a low-rigidity frame and a pair of separators that hold the low-rigidity frame and the membrane electrode assembly therebetween.

First, the components of the fuel cell single cell will be described.

Low-Rigidity Frame

The low-rigidity frame 1 has the shape of a thin plate with an approximately uniform thickness, which is thinner than the membrane electrode assembly 2 in most part except the edge part. The thickness of the low-rigidity frame 1 ranges from 0.01 mm to 0.5 mm.

The low-rigidity frame 1 is constituted by a resin frame. The resin frame is integrated with the membrane electrode assembly 2 by resin molding (e.g. injection molding). In the embodiment, the resin frame has a rectangular shape, and the membrane electrode assembly 2 is disposed at the center thereof.

The resin of the resin frame is insulative, and examples of such resins include PET (polyethylene terephthalate), PEN (polyethylene naphthalate), SPS (syndiotactic polystyrene), PI (polyimide) and the like.

Membrane Electrode Assembly

For example, the membrane electrode assembly 2, which is generally referred to as an MEA, includes an electrolyte layer of a solid polymer that is held between an air electrode layer (cathode) and a fuel electrode layer (anode).

When oxidant gas (air) and fuel gas (hydrogen) are supplied as reaction gases respectively to the air electrode layer and the fuel electrode layer, the membrane electrode assembly 2 generates electric power by an electrochemical reaction.

The membrane electrode assembly 2 may include gas diffusion layers of carbon paper, porous material or the like on the surfaces of the air electrode layer and the fuel electrode layer.

Separator

The pair of separators 3a, 3b is electrically conductive. For example, the separators 3a, 3b are constituted by metal separators which are press-molded metal plates of stainless steel or the like.

First Embodiment

FIG. 2 to FIG. 5B illustrate a fuel cell single cell according to an embodiment of the present invention.

Figure 2:
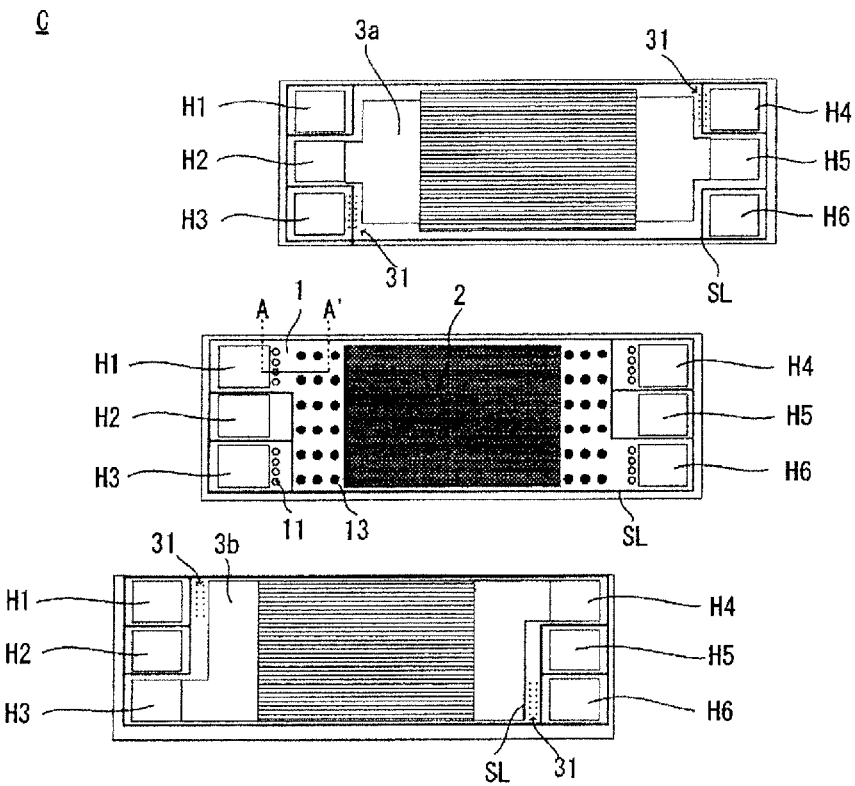
FIG. 2 is a plan view of a fuel cell single cell according to an embodiment of the present invention in a disassembled state.

As illustrated in FIG. 2, the fuel cell single cell C includes a membrane electrode assembly 2 supported by a low-rigidity frame 1, and a pair of separators 3a, 3b that hold the low-rigidity frame 1 and the membrane electrode assembly 2 therebetween.

All the low-rigidity frame 1 and the pair of separators 3a, 3b have an approximately rectangular shape with approximately the same dimension. The membrane electrode assembly 2 supported by the low-rigidity frame 1 and the pair or separators 3a, 3b are stacked to form the fuel cell single cell C.

The fuel cell single cell C includes a gas channel I for supplying gas to the membrane electrode assembly disposed between the pair of separators and manifold parts H1 to H6 that are formed at the ends of the low-rigidity frame 1 and the pair of separators 3a, 3b. The manifold parts are provided to supply the gas to the gas channel I.

The manifold parts H1 to H3 are configured respectively to supply oxidant gas (H1), to supply cooling fluid (H2) and to supply fuel gas (H3), which are communicated in the stacking direction to form respective channels.

The other manifold parts H4 to H6 at the right side in FIG. 2 are configured respectively to discharge the fuel gas (H4), to discharge the cooling fluid (H5) and to discharge the oxidant gas (H6), which are communicated in the stacking direction to form respective channels. The positional relationship of the manifold parts may be partly or fully reversed in respect of supply and discharge.

Figure 3:
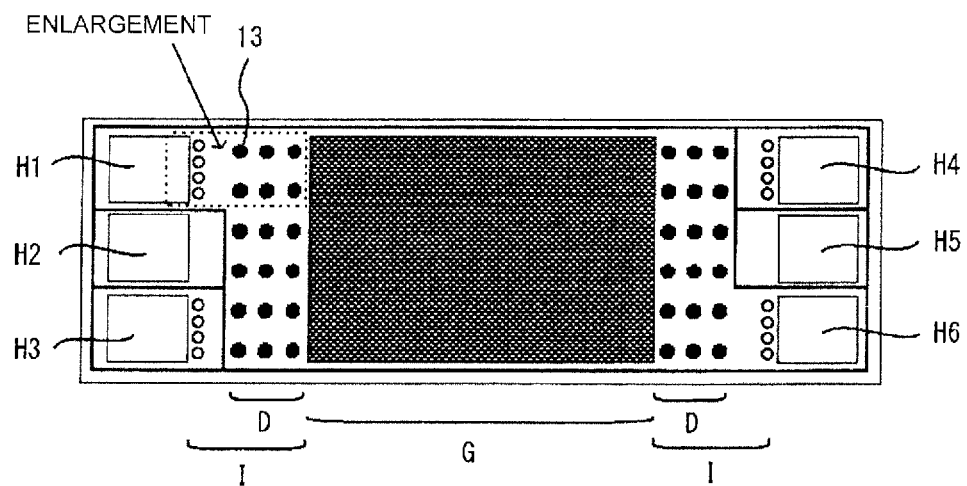
FIG. 3 is a plan view of a low-rigidity frame of the fuel cell single cell in FIG. 2.

As illustrated in FIG. 3, a diffuser part D is further provided in the gas channel I. The diffuser part D aligns flow of the reaction gas introduced through the gas flow parts, in which truncated cone protrusions 13 are integrally formed at predetermined intervals. The protrusions 13 may have any shape that does not block flow of the reaction gas. Further, the protrusions 13 may be formed in the separators 3a, 3b.

In the power generator part G, the center parts of the separators 3a, 3b corresponding to the membrane electrode assembly 2 are formed in a shape having a corrugated transverse cross section in their short side direction. The corrugation extends in the longitudinal direction as illustrated in FIG. 2. The ridges of the corrugation of the separators 3a, 3b are in contact with the membrane electrode assembly 2, and the reaction gas flows through the grooves of the corrugation.

As illustrated in FIG. 2, the fuel cell C includes gas sealers SL that are disposed between the edges of the low-rigidity frame 1 and the pair of separators 3a, 3b and around the manifold parts H1 to H6.

The gas sealers SL gas-tightly separate respective flow areas of the oxidant gas, the reaction gas and the cooling fluid in respective interlayers. Further, the gas sealers SL have openings that are formed at suitable locations in the peripheries of the manifold parts H1 to H6.

When a plurality of fuel cell single cells C is stacked, the gas sealers SL are also disposed between the fuel cell single cells C, i.e. between adjacent separators 3a, 3b. In the embodiment, the cooling fluid flows between adjacent separators.

Figure 4:
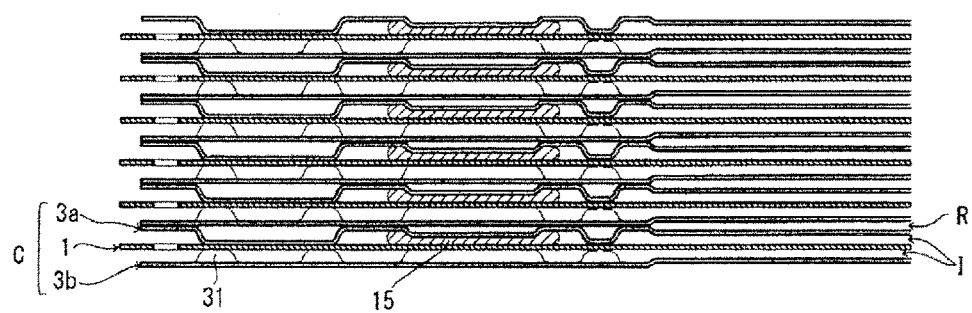
FIG. 4 is a schematic view of the fuel cell single cell of the present invention in a stacked state.

FIG. 4 is a cross-sectional view of the stacked plurality of fuel cell single cells C taken along the line A-A' in FIG. 2. In FIG. 4, the reference sign 1 designates the low-rigidity frame, the reference sign 3 designates the separators, the reference sign 31 designates restraining ribs, the reference sign 15 designates an inter-electrode sealer, the reference sign I designates the gas channel, and the reference sign R designates a cooling fluid channel.

Figure 5A:
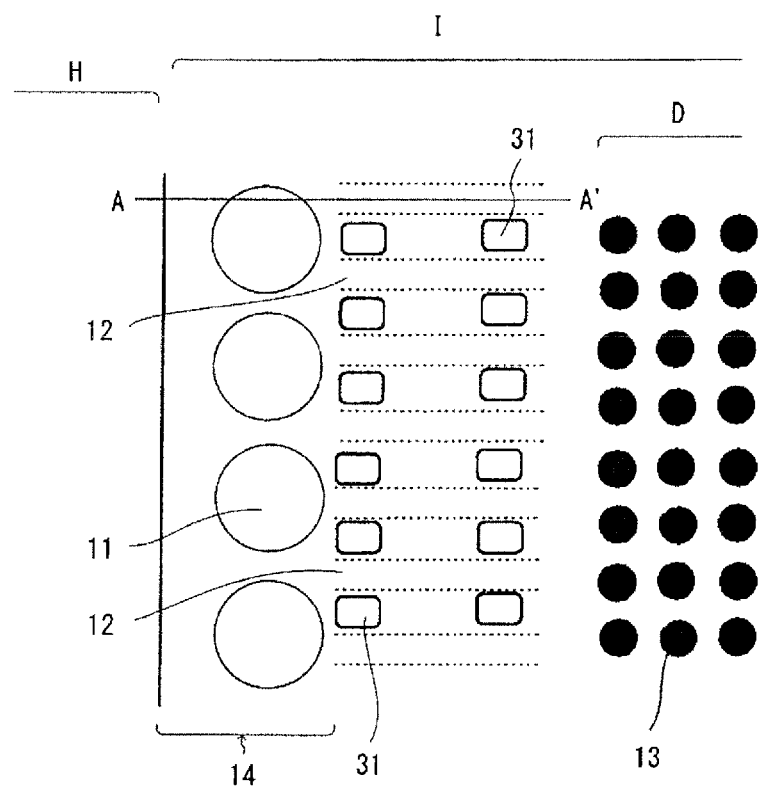
FIG. 5A and FIG. 5B are schematic enlargements of a gas channel I illustrated by the dotted lines in FIG. 3.
Figure 5B:
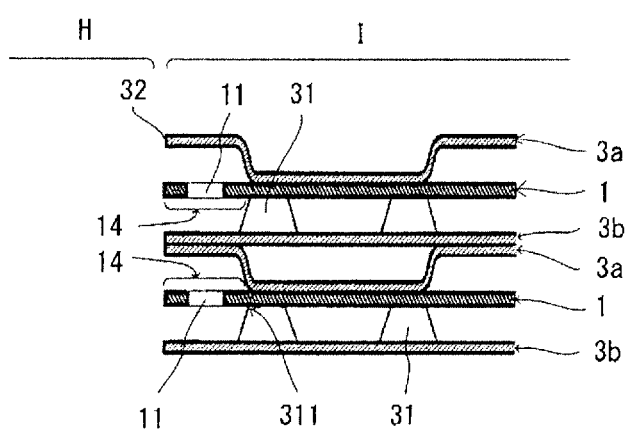

FIG. 5A and FIG. 5B are schematic enlargements of the gas channel I indicated by the dotted lines in FIG. 3. FIG. 5A illustrates the side of the low-rigidity frame 1 on which the reaction gas flows, which is a view from the stacking direction, and FIG. 5B is a cross-sectional view taken along A-A' in FIG. 5A.

As illustrated in FIG. 5A and FIG. 5B, the fuel cell C includes the restraining ribs 31 that are disposed near the manifold parts in the gas flow part I to restrain the low-rigidity frame 1. As illustrated in FIG. 5B, the restraining ribs 31 press the low-rigidity frame 1, which is disposed between the pair of separators 3a, 3b spaced in the stacking direction, against the separator 3a to hold it between the restraining ribs 31 and the separator 3a.

As illustrated in FIG. 5A and FIG. 5B, the low-rigidity frame 1 includes a projected part 14 that projects toward the manifold part beyond the restraining ribs 31. The projected part 14 includes gas flow parts 11 for supplying gas from the manifold part to the gas channel.

The reaction gas supplied from the manifold part flows between the pair of separators 3a, 3b. However, the low-rigidity frame 1 may sometimes be deformed to block the flow of the reaction gas since the low-rigidity frame 1 between the pair of separators is not restrained in the projected part 14 by the restraining ribs 31.

Figure 6A:
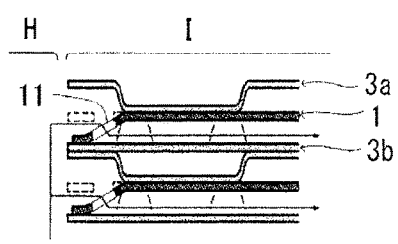
FIG. 6A illustrates flow of reaction gas in a fuel cell single cell according to a first embodiment of the present invention.
Figure 6B:
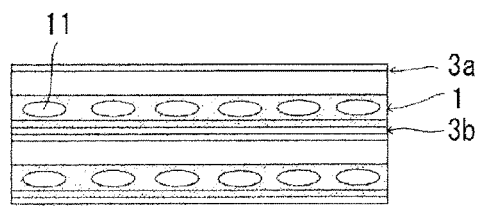
FIG. 6B is a schematic view of gas channels from manifold parts.

FIG. 6A and FIG. 6B are schematic views of the low-rigidity frame 1 that is deformed to be in contact with the separator 3b. FIG. 6A is a cross-sectional view taken along A-A' in FIG. 5A, and FIG. 6B is a view of the gas channel direction from the manifold parts by rotating FIG. 6A by 90 degrees.

That is, in the first embodiment, even when the low-rigidity frame 1 at the position indicated by the dotted line in FIG. 6A is deformed to come in contact with the separator 3b, the gas channel can be seen from the manifold part through the gas flow parts as illustrated in FIG. 6B. Therefore, the reaction gas is supplied from the manifold parts to the gas channel through the gas flow parts provided on the low-rigidity frame as illustrated by the arrows in FIG. 6A, in which the gas flow is not blocked by the low-rigidity frame.

It is preferred that the distance from the gas flow parts 11 to the manifold-side ends 311 of the restraining ribs 31 is shorter than the height of the restraining ribs 31. The gas flow parts 11 that are formed near the restraining ribs 31 can ensure flow of the reaction gas even when the low-rigidity frame 1 is deformed to a great extent.

As described above, in the first embodiment, the gas flow parts 11 such as through holes are provided in the projected part 14 that projects toward the manifold part beyond the restraining ribs 31. The gas flow parts 11 allow gas to be supplied from the manifold parts to the gas channel. Therefore, even when the low-rigidity frame 1 is deformed to come in contact with the separator 3b, the gas flow parts 11 ensures the flow of the reaction gas and thus prevents the gas channel from being closed.

Second Embodiment

Figure 7:
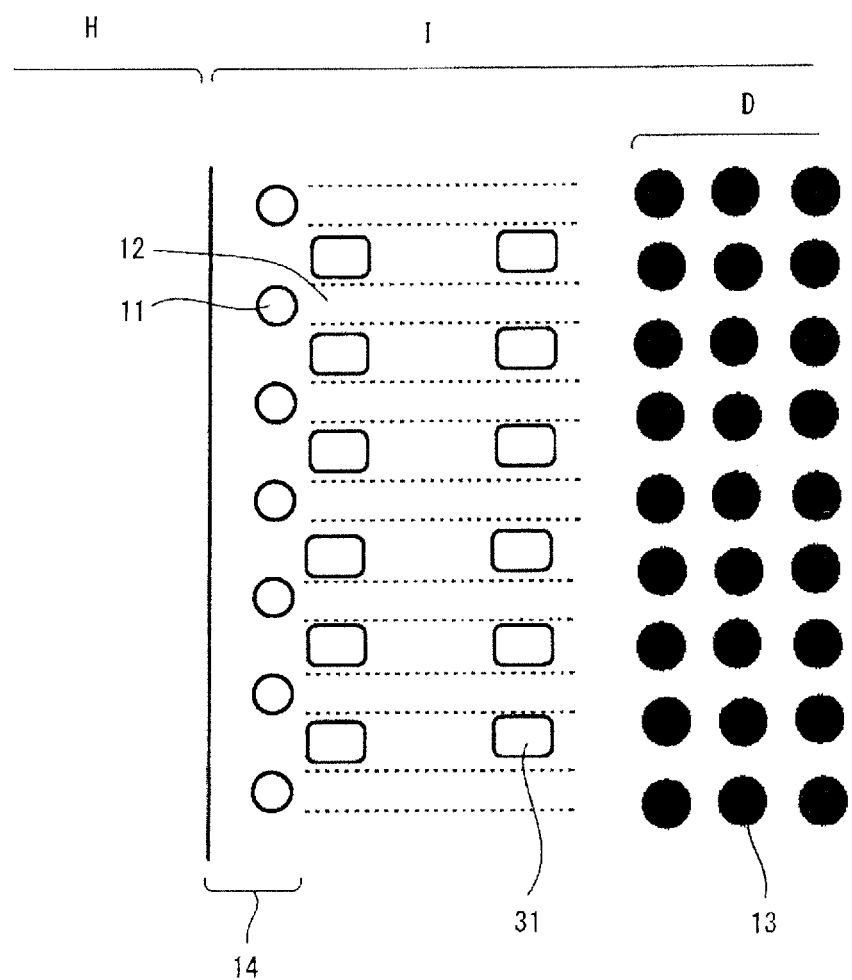
FIG. 7 is a schematic enlargement of a gas channel I of a fuel cell single cell according to a second embodiment of the present invention.

FIG. 7 illustrates a gas channel I of a fuel cell single cell C according to a second embodiment of the present invention, which is a schematic view of the side of a low-rigidity frame 1 on which reaction gas flows.

In the second embodiment, a plurality of restraining ribs 31 are arranged in the gas channel I in the direction perpendicular to the flow direction of the reaction gas. The reaction gas flows through channels 12 defined between the restraining ribs, which are illustrated by the dotted lines in FIG. 7.

Gas flow parts 11 are linearly aligned with the respective channels 12 in the gas flow direction in a straight state.

In the second embodiment, since the gas flow parts 11 are linearly aligned with the channels 12, the reaction gas that has passed through the gas flow parts 11 flows in the channels 12 without colliding with the restraining ribs 31. This reduces the pressure loss and facilitates discharge of water generated in a power generator part G.

Third Embodiment

Figure 8A:
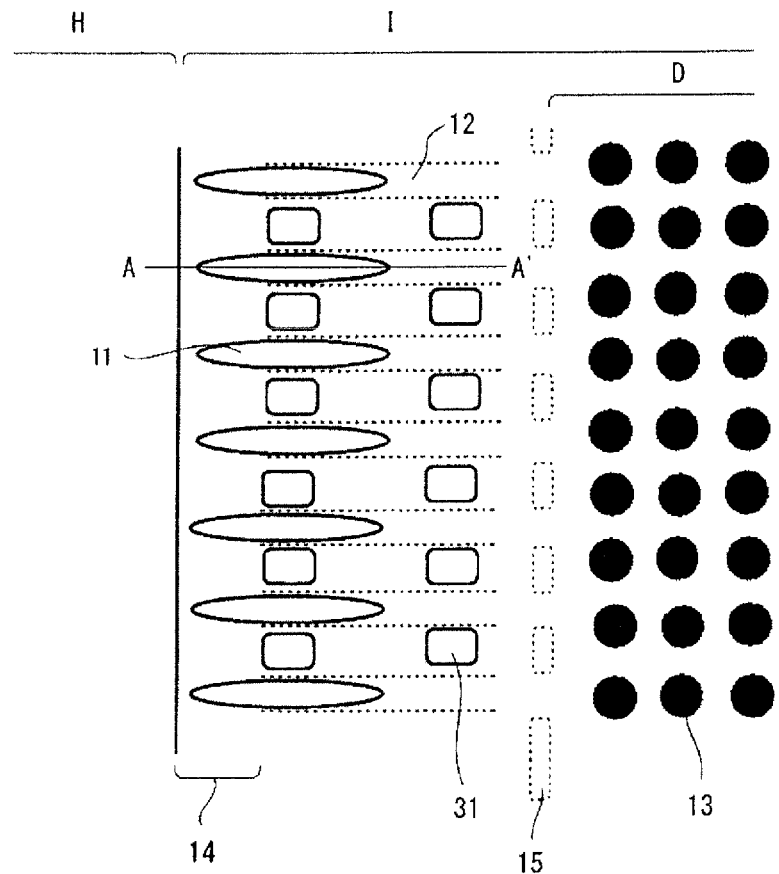
FIG. 8A and FIG. 8B are schematic enlargements of a gas channel I of a fuel cell single cell according to a third embodiment of the present invention.
Figure 8B:
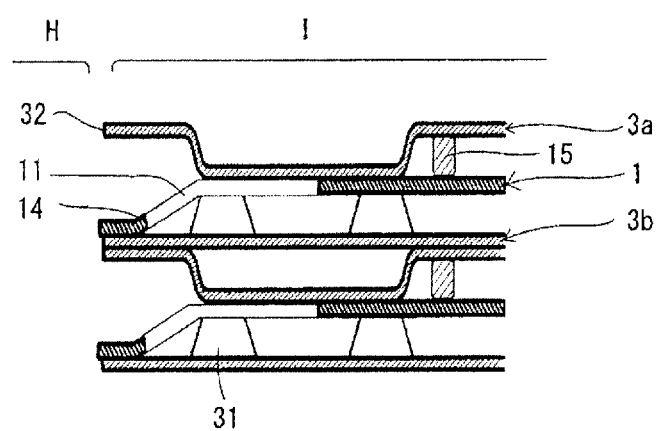

A reaction gas introduction part I of a fuel cell C according to a third embodiment of the present invention will be described with FIG. 8A and FIG. 8B. FIG. 8A is a schematic view of the side of a low-rigidity frame 1 on which reaction gas flows, and FIG. 8B is a cross-sectional view taken along A-A' in FIG. 8A. In FIG. 8A, inter-electrode sealers 15 on the backside are illustrated by the dotted lines. The same reference signs are denoted to the same components as those in the previous embodiments.

In the third embodiment, gas flow parts 11 formed in a projected part 14 of the low-rigidity frame 1 are through holes that penetrate the low-rigidity frame, and the shape of the through holes is anisotropic. The longitudinal direction of the through holes are parallel to the gas flow direction.

The through holes expand toward the inter-electrode sealers 15 that are disposed at the manifold-side of the diffuser part D. That is, the through holes expands not only in the projected part 14 but also to channels 12 between restraining ribs 31.

While the through holes have an oval shape in FIG. 8A, they may have a polygonal shape such as a rectangular shape.

In the third embodiment, the anisotropic through holes are continuously formed from the projected part 14 into the channels 12 between the restraining ribs 31. This increases the height of the channels by the thickness of the low-rigidity frame 1 as illustrated in FIG. 8B and thereby reduces the pressure loss and facilitate discharge of water generated in a power generator part G.

Fourth Embodiment

Figure 9:
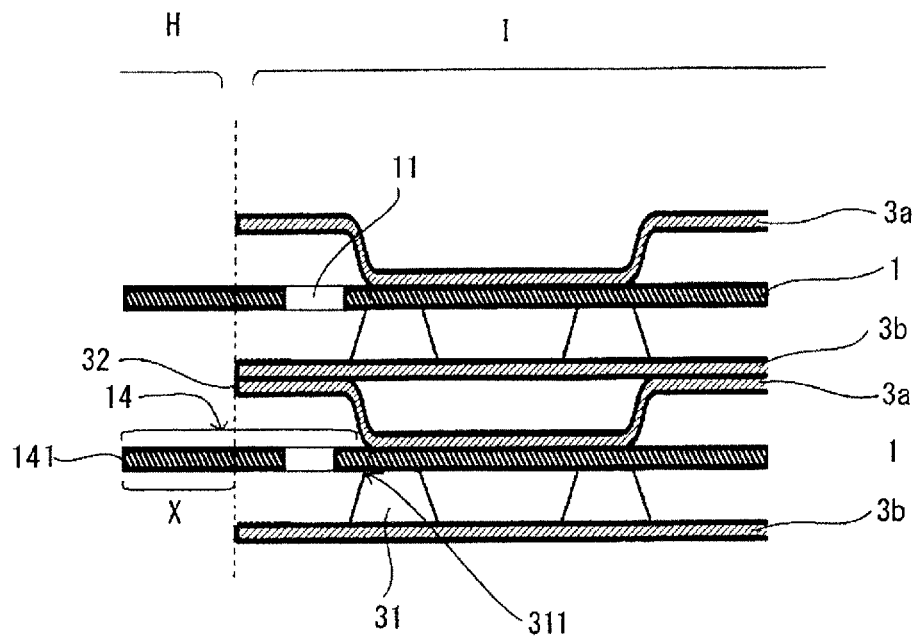
FIG. 9 is a schematic enlargement of a gas channel I of a fuel cell single cell according to a fourth embodiment of the present invention.

A gas introduction part I of a fuel cell C according to a fourth embodiment of the present invention will be described with FIG. 9. FIG. 9 is a schematic cross-sectional view of the gas introduction part I of the fuel cell C taken in the stacking direction.

The same reference signs are denoted to the same components as those in the previous embodiments.

In the fourth embodiment, a projected part 14 of a low-rigidity frame 1 projects toward a manifold part beyond open ends 32 of a pair of separators 3a, 3b corresponding to the manifold parts.

That is, the length from an open end 141 corresponding to the manifold part of the low-rigidity frame 1 to ends 311 of restraining ribs 31 is longer than the length from the open ends 32 corresponding to the manifold parts of the separators to the ends 311 of the restraining ribs 31.

The projected length X of the part of the projected part 14 that is further projected toward the manifold part beyond the open ends 32 of the separators satisfies the following Equation (1).

$$X \geq \delta(1-\sin\theta - 1/\tan\theta) + \text{Component Tolerance} + \text{Component Stacking Tolerance} \quad (1)$$

In Equation (1), $\delta$ is the deformation amount of the low-rigidity frame, and $\theta$ is the deformation angle of the low-rigidity frame.

Figure 10:
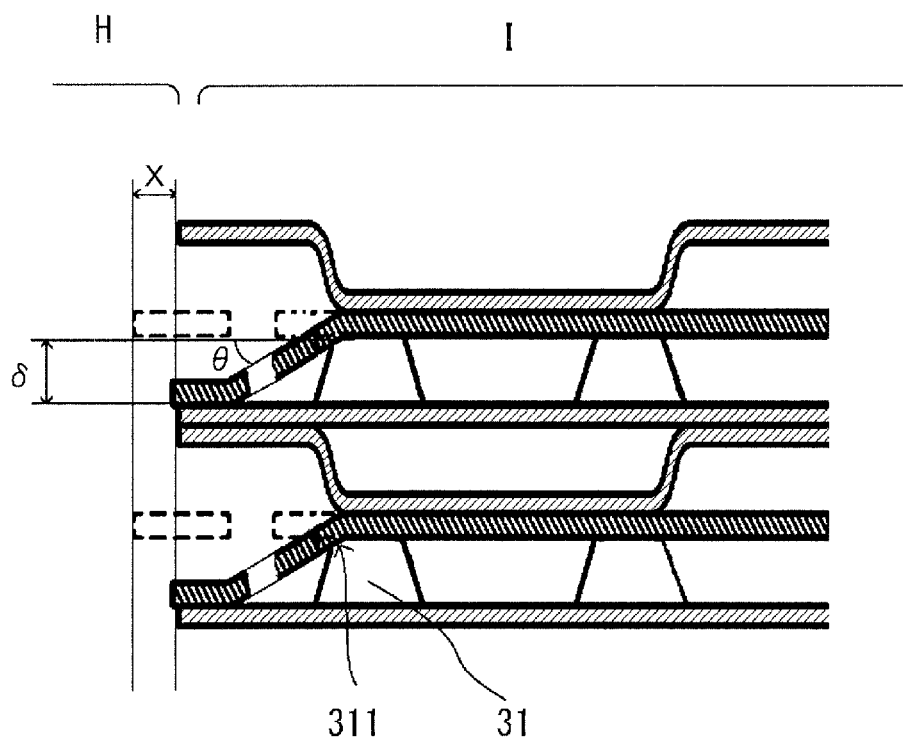
FIG. 10 illustrates the projected length X of a fuel cell single cell according to the fourth embodiment of the present invention.

As illustrated in FIG. 10, the deformation amount $\delta$ of the low-rigidity frame 1 typically corresponds to the height of a gas channel, i.e. the height of the restraining ribs 31, and the deformation angle $\theta$ of the low-rigidity frame 1 corresponds to the angle between the top and the slope to the top of the restraining ribs 31.

Further, gas flow parts 11 are formed closer to a membrane electrode assembly 2 than the open ends 32 of the separators corresponding to the manifold parts.

When the gap between the pair of separators 3a, 3b of a fuel cell single cell C is narrow, even a small deformation of one of the pair of separators 3a, 3b may bring the separator 3a into contact with the separator 3b to cause a short circuit.

In the fourth embodiment, the projected part 14 of the low-rigidity frame 1 projects toward the manifold part beyond the open ends 32 of the separators 3a, 3b corresponding to the manifold part.

With this configuration, even when the low-rigidity frame 1 is deformed, the insulative low-rigidity frame 1 is still present between the open end of the separator 3a and the open end of the separator 3b as illustrated in FIG. 10 and surely separates the pair of separators 3a, 3b from each other.

Furthermore, since the gas flow parts 11 are formed closer to a membrane electrode assembly 2 than the open ends 32 of the separators, the separator 3a and the separator 3b are prevented from coming into contact with each other through the gas flow parts 11.

Therefore, even when the fuel cell single cell C is restrained and pressed in the stacking direction, the separator 3a and the separator 3b are prevented from directly coming into contact with each other, and the separators 3a, 3b are surely insulated so as not to cause a short circuit between the separators 3a and 3b. When the fuel cell is installed in a vehicle, the separators 3a, 3b are prevented from a short circuit even in the event of a large impact.

Fifth Embodiment

In this embodiment, diffuser parts D of gas channels I are disposed between a manifold part H1 and a manifold part H3 and between a manifold part H4 and a manifold part H6. The configuration is the same as those of the above-described embodiments 1 to 4 except that a low-rigidity frame and separators are configured to alter flow direction of reaction gas supplied from the manifold parts in an approximately right angle at the diffuser parts D so as to supply it to a power generator part G.

Figure 11A:
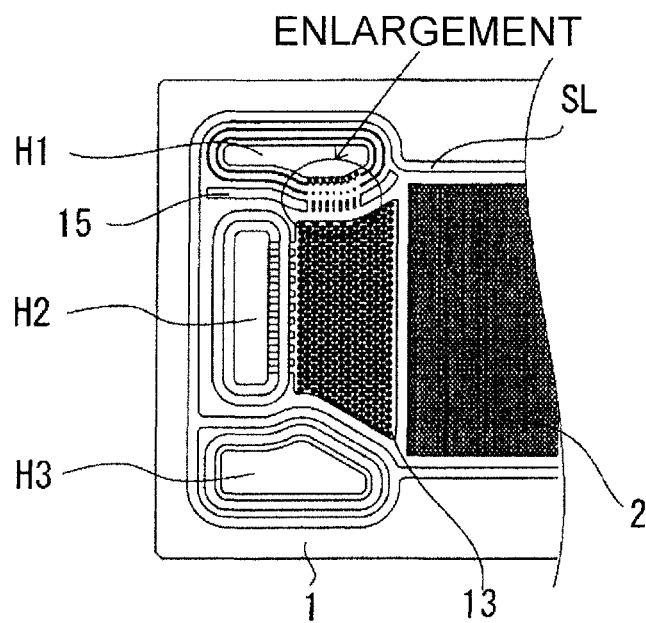
FIG. 11A and FIG. 11B illustrate the main part of a frame according to a fifth embodiment of the present invention, which is a view of the side on which reaction gas flows in the stacking direction
Figure 11B:
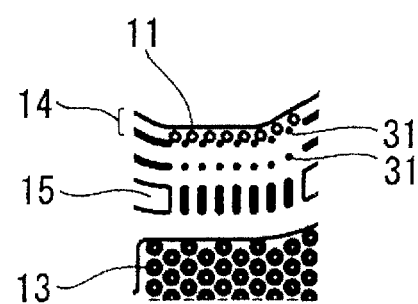

FIG. 11A illustrates the main part of the side of the low-rigidity frame 1 on which the reaction gas flows, which is a view from the stacking direction. FIG. 11B is an enlargement of a gas introduction part I enclosed by the circle in FIG. 11A.

In FIG. 11A and FIG. 11B, the reference sign 1 designates the low-rigidity frame, the reference sign 2 designates a membrane electrode assembly, the reference signs H1 to H3 designate the manifold parts, the reference sign SL designates a gas sealer, the reference sign 13 designates protrusions, the reference sign 15 designates inter-electrode sealers, the reference sign 11 designates gas flow parts, the reference sign 14 designates a projected part, and the reference sign 31 designates restraining ribs.

In the fifth embodiment, the diffuser part D is disposed between the manifold part H1 and the manifold part H3 so as to alter flow direction of the reaction gas in an approximately right angle. This can diffuse the flow of the reaction gas so that the reaction gas is uniformly supplied to the power generator part G.

Figure 12:
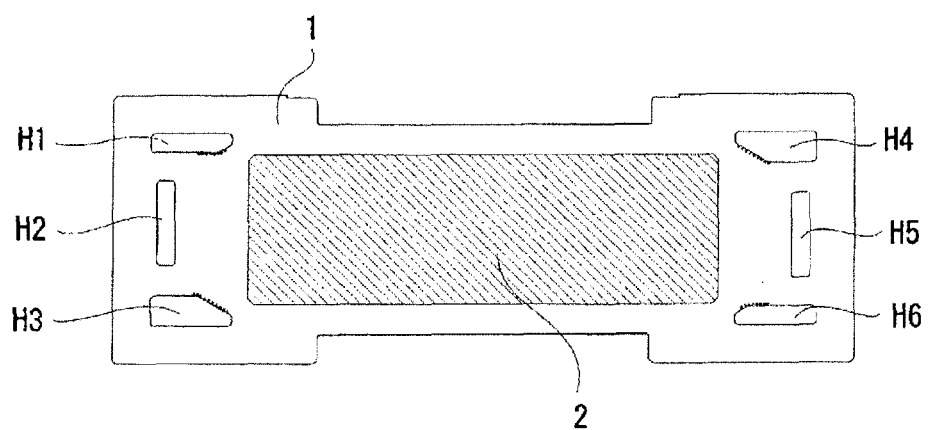
FIG. 12 illustrates the outer shape of the frame according to a fifth embodiment of the present invention.

The low-rigidity frame 1 and the pair of separators 3a, 3b may have an H-shape as illustrated in FIG. 12 instead of a rectangular shape. A weight reduction can be achieved by such H-shaped low-rigidity frame and separators.

Sixth Embodiment

A gas introduction part I of a fuel cell C according to a sixth embodiment of the present invention will be described with FIG. 13.

Figure 13:
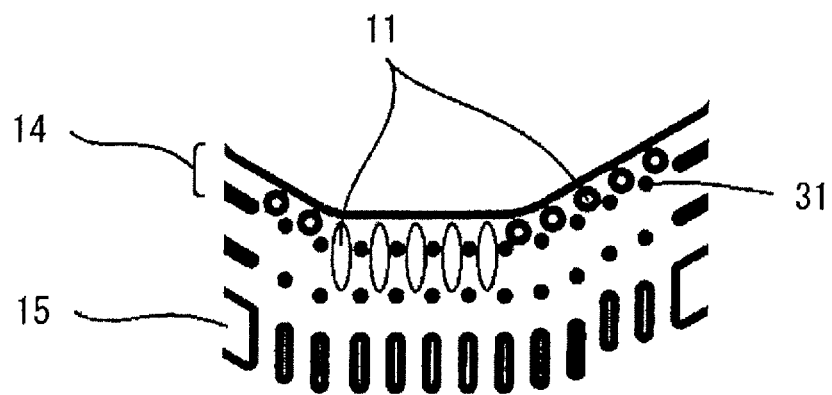
FIG. 13 is a schematic view of an example in which gas flow parts having an anisotropic shape are partially disposed.

This embodiment is the same as the fifth embodiment except that manifold parts are projected toward a gas channel as illustrated in FIG. 13, and gas flow parts have an anisotropic shape only in the scooped parts of the low-rigidity frame 1 corresponding to the projections.

In the sixth embodiment, the anisotropic shape of the gas flow parts in the scooped parts of the low-rigidity frame 1 reduces the pressure loss.

REFERENCE SIGNS LIST

1 Low-rigidity frame
11 Gas flow part
12 Channel
13 Protrusion
14 Projected part
141 Open end
15 Inter-electrode sealer
2 Membrane electrode assembly
3a, 3b Separator
31 Restraining rib
311 End
32 Open end C Fuel cell single cell
H1 to H6 Manifold part
I Gas channel
D Diffuser part
G Power generator part
SL Gas sealer
FS Fuel cell stack
A Stack
4A, 4B Current collector plate
5 Spacer
6A, 6B End plate
7A, 7B Fastening plate
8A, 8B Reinforcing plate
B Bolt

The invention claimed is:

1. A single cell structure for a fuel cell, comprising:
a membrane electrode assembly;
a low-rigidity frame that supports the membrane electrode assembly;
a pair of separators that holds the low-rigidity frame and the membrane electrode assembly therebetween;
a gas channel for supplying gas to the membrane electrode assembly between the pair of separators;
manifold parts that are formed in the low-rigidity frame and the pair of separators to supply the gas to the gas channel;
restraining ribs that restrain the low-rigidity frame near the manifold parts;
a projected part of the low-rigidity frame that projects toward the manifold parts beyond the restraining ribs; and
a gas flow part that is formed in the projected part to supply the gas from the manifold parts to the gas channel.

2. The single cell structure for a fuel cell according to claim 1, wherein the gas flow part is a through hole that penetrates the low-rigidity frame.

3. The single cell structure for a fuel cell according to claim 1, wherein a channel through which the gas flows is defined between the restraining ribs.

4. The single cell structure for a fuel cell according to claim 3, wherein the gas flow part has an anisotropic shape and is long in a flow direction of the gas.

5. The single cell structure for a fuel cell according to claim 4, wherein the gas flow part has an oval shape.

6. The single cell structure for a fuel cell according to claim 1, wherein the projected part of the low-rigidity frame projects toward the manifold parts beyond separator open ends of the separators that are formed closer to the manifold parts than the restraining ribs.

7. The single cell structure for a fuel cell according to claim 6, wherein a projected length X which projects toward the manifold parts beyond the open ends of the separators satisfies the following Equation (1), $$X \geq \delta(1/\sin\theta - 1/\tan\theta) + \text{Component Tolerance} + \text{Component Stacking Tolerance} \quad (1)$$

in Equation (1), $\delta$ is a deformation amount of the low-rigidity frame, and $\theta$ is a deformation angle of the frame.

8. The single cell structure for a fuel cell according to claim 6, wherein a length from an open end corresponding to the manifold parts of the low-rigidity frame to an end of the restraining ribs is longer than a length from the open ends corresponding to the manifold parts of the separators to the end of the restraining ribs.

9. The single cell structure of a fuel cell according to claim 8, wherein the gas flow part is disposed in the projected part closer to the membrane electrode assembly than the open ends corresponding to the manifold parts of the separators.

10. A fuel cell stack structure that comprises a stacked plurality of single cells, wherein each of the plurality of single cells comprises:
a membrane electrode assembly;
a low-rigidity frame that supports the membrane electrode assembly;
a pair of separators that holds the low-rigidity frame and the membrane electrode assembly therebetween;
a gas channel for supplying gas to the membrane electrode assembly between the pair of separators;
manifold parts that are formed in the low-rigidity frame and the pair of separators to supply the gas to the gas channel;
restraining ribs that restrain the low-rigidity frame near the manifold parts;
a projected part of the low-rigidity frame that projects toward the manifold parts beyond the restraining ribs; and
a gas flow part that is formed in the projected part to supply the gas from the manifold parts to the gas channel.

* * * * *